United States Patent [19]

Sweet

[11] Patent Number: 5,192,187
[45] Date of Patent: Mar. 9, 1993

[54] ADJUSTABLE LOAD BRACING CROSSBAR

[76] Inventor: Lawrence H. Sweet, Rte. 6, Box 432-S, Mooresville, N.C. 28115

[21] Appl. No.: 780,636

[22] Filed: Oct. 23, 1991

[51] Int. Cl.⁵ ............................................. B61D 45/00
[52] U.S. Cl. .................................... 410/151; 410/145; 254/133 R
[58] Field of Search ............... 410/124, 128, 143, 145, 410/146, 147, 148, 149, 150, 151, 156; 254/93 R, 102, 133 R

[56] References Cited

U.S. PATENT DOCUMENTS

| | | |
|---|---|---|
| Re. 26,309 | 11/1967 | Heard . |
| 2,608,420 | 8/1952 | Eck . |
| 2,802,635 | 8/1957 | Engelbart . |
| 2,917,953 | 12/1959 | Badali . |
| 2,964,965 | 12/1960 | Hanson . |
| 2,974,931 | 3/1961 | Reel et al. ............................ 410/128 |
| 3,053,549 | 9/1962 | Mutto . |
| 3,151,571 | 10/1964 | Heard . |
| 3,329,404 | 7/1967 | Castoe . |
| 3,345,956 | 10/1967 | Dunlop . |
| 3,355,136 | 11/1967 | Staples . |
| 3,521,902 | 7/1970 | Akers . |
| 3,699,898 | 10/1972 | Nolan ............................. 410/151 X |
| 3,735,958 | 5/1973 | Hollingsworth . |
| 3,750,254 | 8/1973 | Krajcik . |
| 3,774,939 | 11/1973 | Freads et al. . |
| 3,836,174 | 9/1974 | Holman, Jr. . |
| 3,897,044 | 7/1975 | Tallman . |
| 3,902,699 | 9/1975 | Brackett . |
| 4,124,225 | 11/1978 | Lozada et al. . |
| 4,136,521 | 1/1979 | Merdoza et al. ........... 254/133 R X |
| 4,270,733 | 6/1981 | DePue .............................. 254/93 R |
| 4,330,104 | 5/1982 | Klok . |
| 4,332,515 | 6/1982 | Twyman . |
| 4,473,331 | 9/1984 | Wisecarver . |
| 4,536,114 | 8/1985 | Belew ................................ 410/156 |
| 4,695,035 | 9/1987 | Kennedy et al. ........... 254/133 R X |
| 4,736,505 | 4/1988 | Vanbeber . |

*Primary Examiner*—F. J. Bartuska
*Assistant Examiner*—William M. Hienz
*Attorney, Agent, or Firm*—Bell, Seltzer, Park & Gibson

[57] ABSTRACT

An adjustable freight bracing crossbar is disclosed. The crossbar includes an elongate, substantially hollow, support body. A wall engaging member is connected to one end of the support body. A telescoping tube is slidably mounted within the other end of the support body and projects outward from the tube for engaging a wall. A hydraulic pump mechanism is secured within the support body and includes a piston movable within the tube between a retracted position and an extended position toward the projecting end portion of the tube. A spring is connected to the piston rod and the end portion of the telescoping tube for creating a biasing force between an extended piston and telescoped tube when the crossbar is mounted within a compartment to compensate for slack created between the end portion of the tube and compartment wall such as occurs when the compartment is in transit.

12 Claims, 3 Drawing Sheets

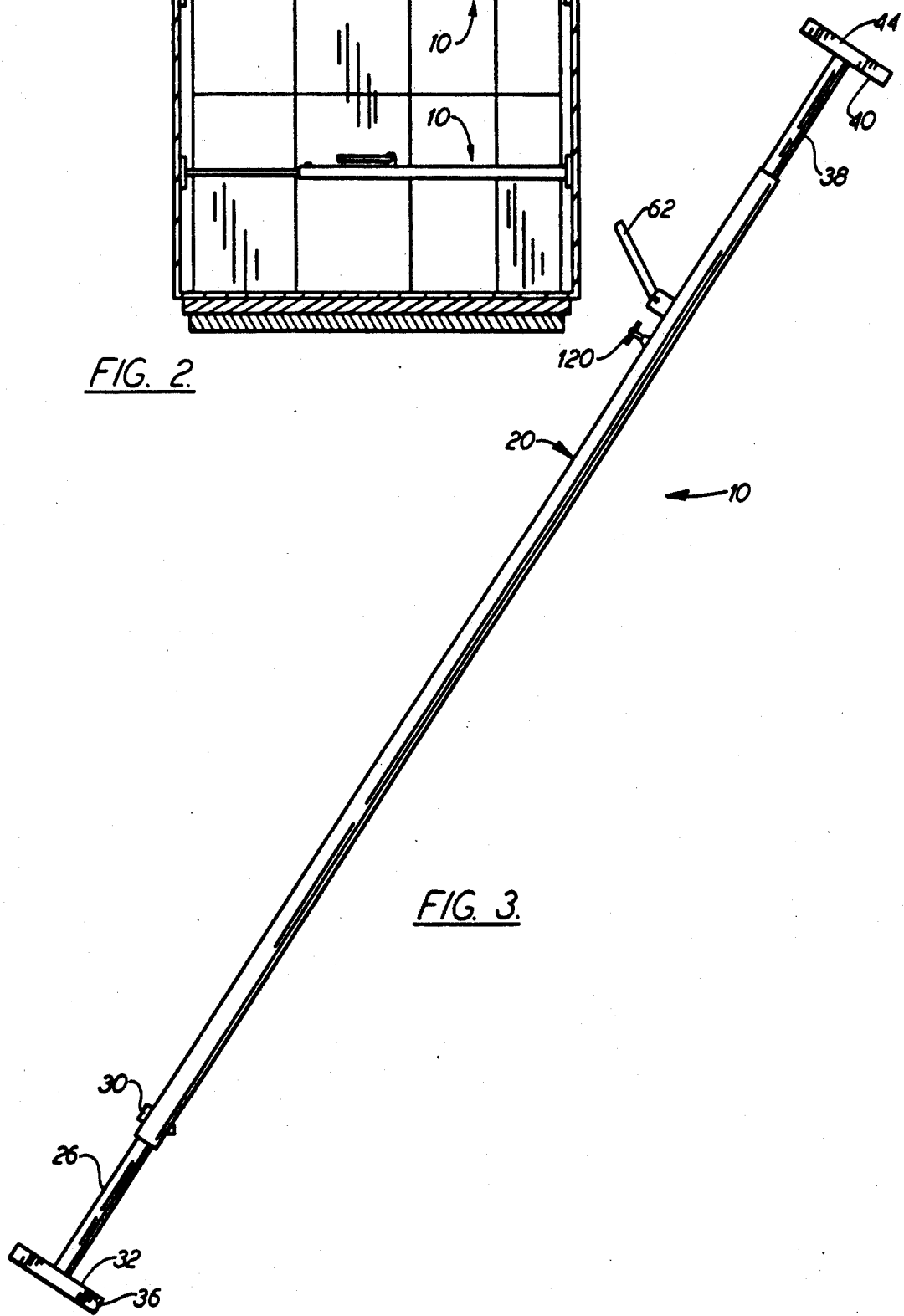

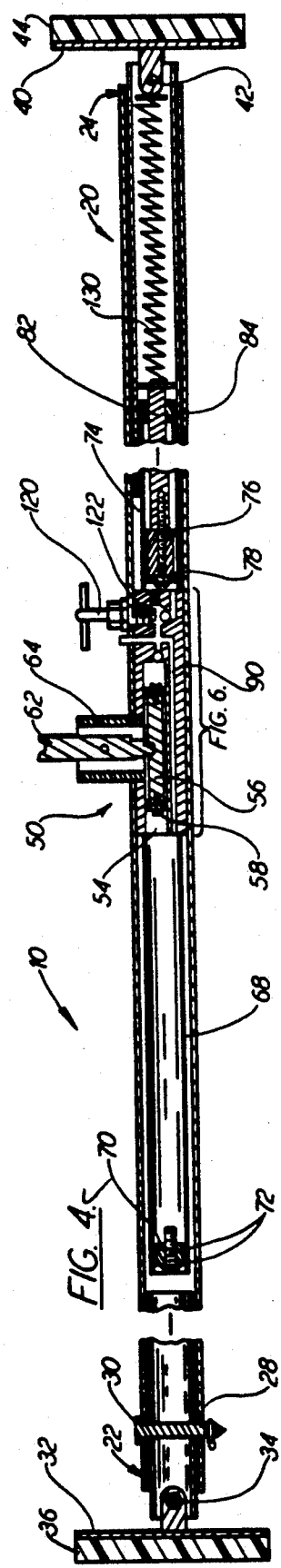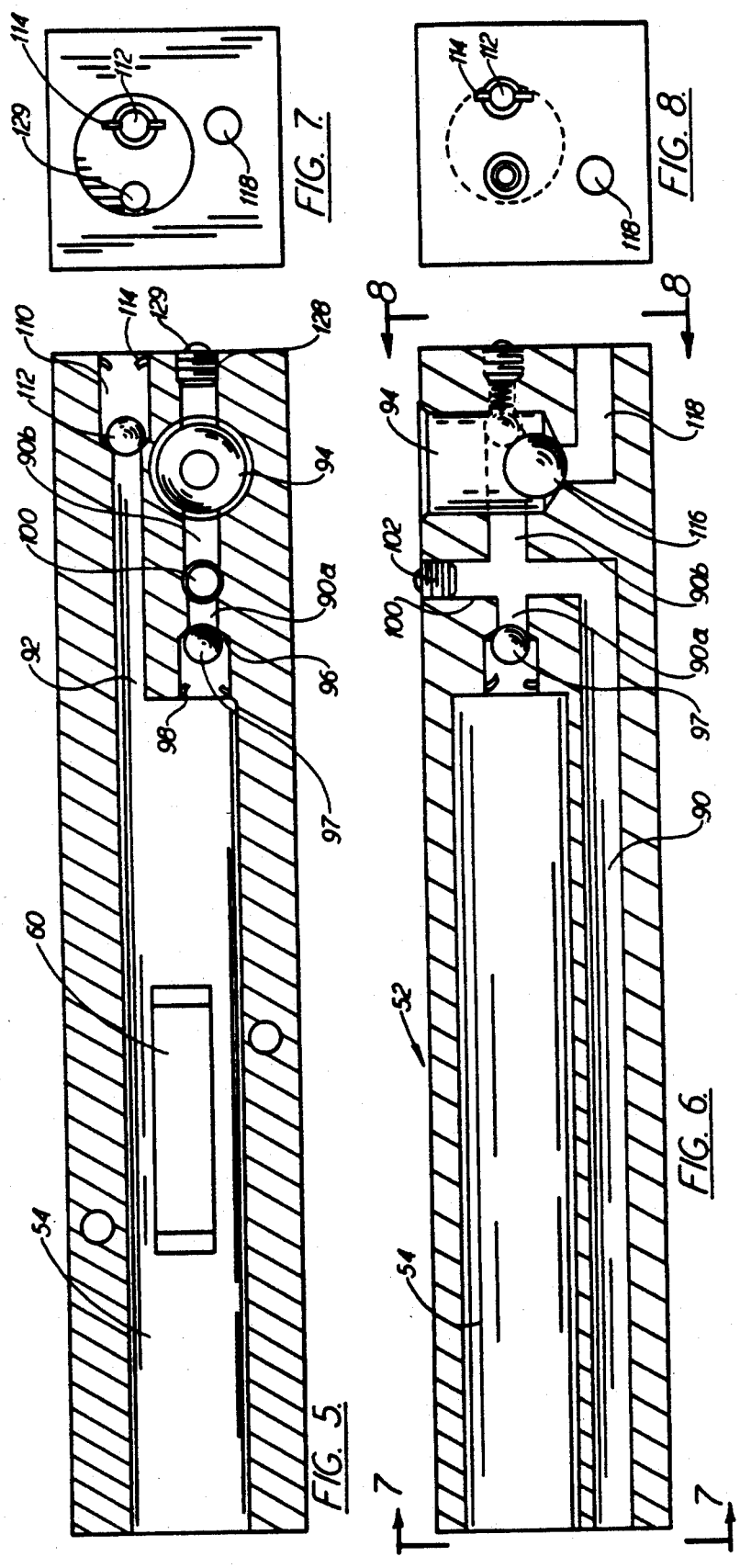

ADJUSTABLE LOAD BRACING CROSSBAR

FIELD OF THE INVENTION

This invention relates to load bracing crossbars used to brace freight loads in compartments.

BACKGROUND OF THE INVENTION

In large compartments, such as ship cargo holds, tractor trailers and railway cargo holds, the goods are often braced or tied-down to prevent movement of the goods during transit. Crossbars that extend from the floor-to-ceiling or from wall-to-wall are often placed within the compartment to restrain the load from movement. Some proposed crossbars are fixed length bars that extend across the compartment. Others include mechanical gear or lever mechanisms that extend a longitudinal telescoping member into contact with the wall or ceiling to secure the crossbar in place. Such mechanical devices often fall from the compartment during transit because the resulting wall movement creates slack between the end portions of the crossbar and the walls. Other proposed mechanical crossbars have springs that bias one end into contact with the wall. However, the mechanical crossbars are difficult to operate, and the slack often created between the compartment walls and the crossbar during transit is not compensated and the crossbar falls.

SUMMARY OF THE INVENTION

It is, therefore, an object of the present invention to provide an adjustable, longitudinally extending load bracing crossbar that provides for adjustability of the crossbar without a strictly mechanical adjustment mechanism.

It is another object of the present invention to provide an adjustable, longitudinally extending, load bracing crossbar that compensates for slack created between a compartment wall and the crossbar, such as when the compartment is in transit.

The adjustable load bracing crossbar of the present invention provides for adjustability without a mechanical mechanism, such as gears, pinions, or other complex mechanical apparatus. The invention additionally provides means for compensating for slack between the crossbar and the wall, which occurs when the compartment is in transit.

In accordance with the present invention, the crossbar includes an elongate, substantially hollow support body having opposing ends. Means is positioned at one end of the support body for engaging the wall of a compartment. A telescoping extension tube is slidably received within the other end of the support body and includes an end portion projecting from the tube and adapted for engaging a wall of the compartment.

A hydraulic pump mechanism is secured within the support body and includes a piston movable within the telescoping tube between a retracted position and an extended position toward the wall engaging end portion of the tube.

Biasing means, in the preferred form of a spring, is connected to the piston and the end portion of the telescoping tube for creating a biasing force between an extended piston and telescoped tube when the crossbar is mounted within a compartment. The biasing force compensates for the slack created between the end portion and a compartment wall such as occurs when the compartment is in transit.

In the preferred embodiment, the hydraulic pump mechanism includes a valve body having a fluid holding chamber with front and rear ends. A pump actuator is slidably mounted in the fluid chamber. A handle is connected to the pump actuator for slidably moving the pump actuator back and forth in the chamber when the handle is pumped. A fluid reservoir is connected to one end of the valve body and communicates with the fluid chamber. A piston cylinder is connected to the other end of the valve body, and the piston is mounted within the piston cylinder. Fluid flow channels are mounted in the valve body and communicate with the fluid chamber, fluid reservoir and piston cylinder for transferring fluid from the fluid reservoir to the piston cylinder for moving the piston to an extended position as the handle is pumped.

In the preferred embodiment, the rear portion of the fluid chamber is open and in communication with the fluid reservoir. A first fluid flow channel has one end connected to the fluid holding chamber end adjacent the piston, and the other end is connected to the fluid reservoir for allowing fluid flow from the reservoir into the front end of the chamber. A second fluid flow channel has one end connected to the fluid holding chamber end adjacent the piston, and the other end is connected to the piston cylinder for fluid flow from the fluid holding chamber into the piston cylinder.

Valve means, in the preferred form of a ball valve, is positioned in each of the first and second channels for allowing fluid flow from the reservoir into the front portion of the fluid holding chamber when the pump actuator is moved rearward, and for allowing fluid flow from the front portion of the fluid holding chamber into the piston cylinder when the pump actuator is moved forward while preventing fluid flow into the reservoir.

A release valve is connected to the fluid channels for selectively relieving the pressure within the fluid channels and the piston cylinder.

DESCRIPTION OF THE DRAWINGS

Some of the objects and advantages of this invention having been set forth above, other objects and advantages will appear as the description proceeds, when taken in conjunction with the accompanying drawings, in which:

FIG. 2 is a sectional view taken along line 2—2 of FIG. 1;

FIG. 3 is a plan view of the crossbar in accordance with the present invention;

FIG. 4 is an enlarged sectional view of the crossbar in accordance with the present invention;

FIG. 5 is an enlarged top sectional view of the valve body;

FIG. 6 is an enlarged side sectional view of the valve body;

FIG. 7 is an end view taken along line 7 of FIG. 6; and

FIG. 8 is an end view taken along line 8 of FIG. 6.

DETAILED DESCRIPTION

Figure 1:
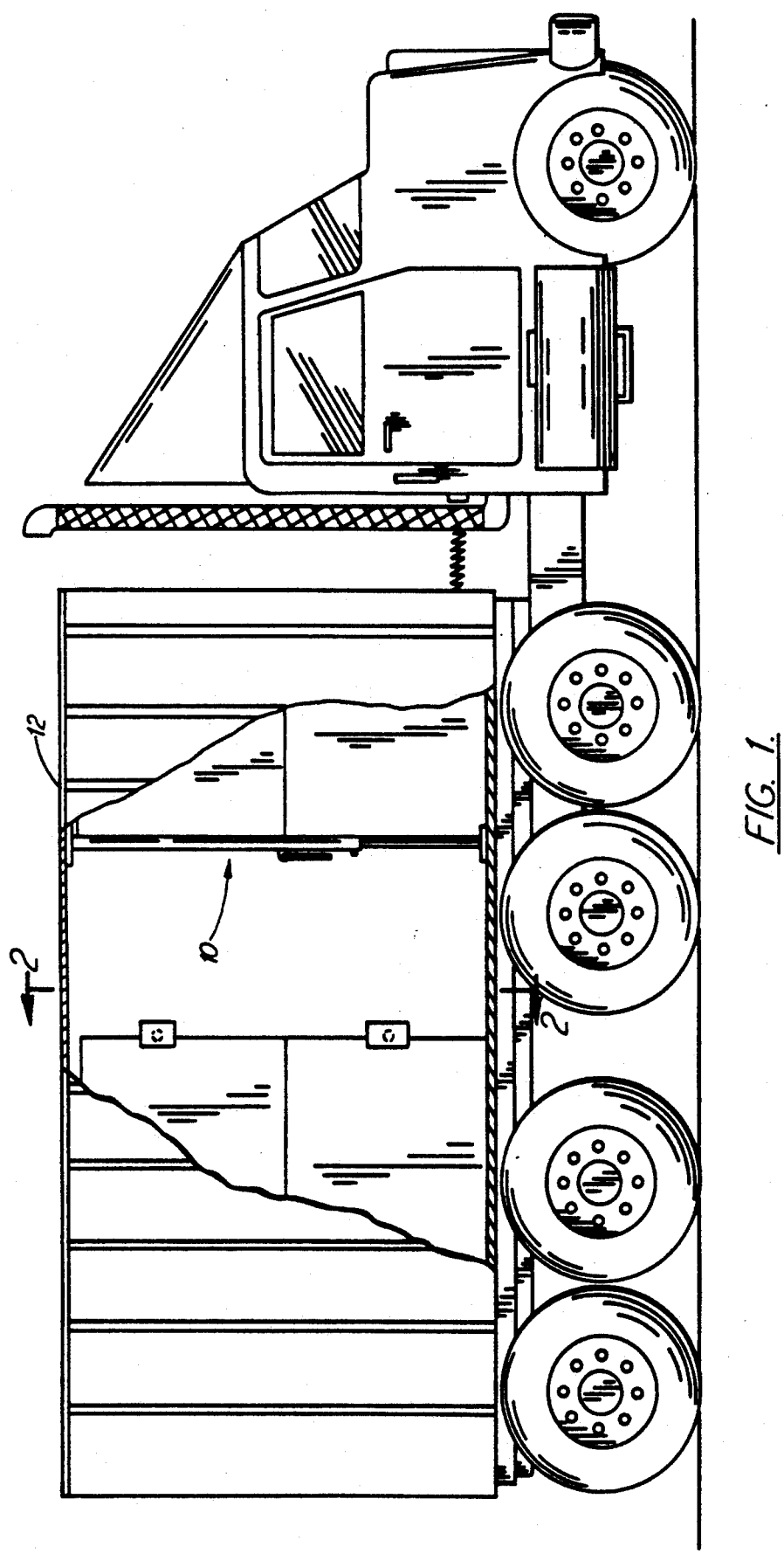
FIG. 1 is a side elevational view of a truck showing a portion of the wall exposed and showing the crossbar of the present invention secured within the truck compartment.

Referring now to the drawings, and more particularly to FIGS. 1 and 2, adjustable load bracing crossbars 10 of the present invention are shown secured between the floor, ceiling and walls of a truck compartment 12. The adjustable load bracing crossbar prevents inadvertent movement of the freight and other goods stored in the compartment during transit of the truck. As shown in FIGS. 3 and 4, the crossbar 10 includes an elongate, substantially hollow support body 20 having a first end 22 and a second end 24. The support body 20 is illustrated as tubular configured; however, the support body can be square, triangular or other configurations. The support body 20 is formed from a rigid, strong material, such as steel, aluminum, or carbon fiber.

A support rod member 26 is slidably received in the first end 22 of the support body 20. The support rod member 26 also is tubular, but will be a different configuration corresponding to the configuration of the support body 20 if the support body is not tubular. In the preferred embodiment, the support rod member 26 is dimensioned to allow a close clearance fit within the support body 22.

The first end of the elongate support body 20 and the support rod 26 each include a plurality of holes 28 for allowing insertion of a pin 30 through aligned holes of the support rod member 26 and support body 20 when the support rod member is slidably extended from the support body. A wall engaging foot member 32 is pivotally mounted on the end of the support rod member by means of a mounting bracket and pin assembly 34. The foot member 32 includes a pad 36 which can be formed of a molded foam or other similar material. The pad 36 not only increases traction between the crossbar and the wall when secured, but also the pad provides a surface that will not scuff or mark the wall.

A telescoping extension tube 38 is slidably received within the second end 24 of the support body 20. The telescoping extension tube 38 also is dimensioned for a close clearance fit with the support rod member 20. An end portion of the extension tube 38 projects from the support body 20. A foot member 40, similar to the other foot member 32 on the first end, is pivotally mounted on the projecting end of the support body 20 by means of another bracket and pin assembly 42. A cushion pad 44 is secured to the foot member 40.

A hydraulic pump mechanism 50 is secured within the support body 20. The hydraulic pump mechanism 50 includes a valve body 52 having a fluid holding chamber 54 (FIGS. 5 & 6). A pump actuator 56 is slidably mounted in the fluid holding chamber 54 (FIG. 4). The pump actuator 56 includes end seals 58 that seal between the pump actuator and inside surface of the fluid chamber 54 so that fluid does not pass between the pump actuator and interior walls when the actuator is moved. A slot 60 is formed in the upper surface of the valve body 52 and extends into the fluid chamber 54 (FIG. 5). A pump handle 62 is mounted on a fixed mounting block 64 secured to the outside surface of the support body 20. The pump handle 62 extends into the valve body through the slot 60 (FIG. 5) and connects to the pump actuator 56. As the handle 62 is pumped, the pump actuator 56 is moved within the fluid holding chamber 54.

The end portion of the fluid chamber 54 is open, and a fluid reservoir 68 is connected to the end portion of the valve body 52 (FIGS. 4 and 5). The fluid reservoir 68 comprises a cylindrically configured holding vessel mounted within the support body 20. A floating piston 70 is mounted within the fluid reservoir 68. Sealing rings 72 extend around the piston periphery and engage the interior wall of the fluid reservoir 68 to prevent fluid from passing around the seals 72 when the pump actuator 56 is moved.

A piston cylinder 74 is connected to the front end of the valve body 52 (FIG. 4). As illustrated, the cylinder 74 is an elongate, cylindrical member extending through a portion of the support body 20. A piston 76 is slidably mounted within the cylinder 74. The piston 76 includes a seal 78 secured onto the cylinder piston by a threaded assembly (not shown in detail) that extends through the cylinder piston 76. A piston rod 82 is secured to the piston 76 by means of the threaded assembly. The piston rod 82 extends through the end of the cylinder 74. A rod guide and seal 84 is positioned at the end of the cylinder 74 and prevents dirt from entering the piston cylinder.

First and second fluid flow channels 90,92 are integrally formed in the valve body 52 and communicate with the fluid holding chamber 54, fluid reservoir 68 and piston cylinder 74 by transferring fluid from the fluid reservoir to the piston cylinder as the pump actuator 56 is moved (FIGS. 5 and 6). As fluid is transferred, the piston 76 is moved to an extended position.

The first fluid flow channel 90 has one end connected to the fluid holding chamber 54 adjacent the piston 56. The channel 90 extends through the valve body 52 and terminates at the end of the valve body in which the fluid reservoir 68 is connected. The channel 90 includes an axially directed channel portion 90a that extends into the fluid holding chamber 54. A second portion 90b extends axially into a large bore opening 94 formed in the valve body 52.

The first portion 90a of the fluid channel includes a counterbored area forming a ball valve seat 96. A ball 97 is retained in the counter-bored area by means of flat retaining members 98, such as flared extensions formed in the material, which prevent the ball 97 from moving into the fluid holding chamber 54. A plug 102 extends into an outlet opening 100 that was formed during manufacture. The plug 102 permanently plugs the hole.

The second fluid channel 92 extends from the fluid holding chamber 54 to the cylinder 74. The portion of the fluid channel 92 extending into the fluid holding chamber 54 includes a counterbored area 110 forming a ball valve seat. A ball 112 is seated against the valve seat. Retaining members 114 prevent the ball from passing out of the channel.

The large counterbored opening 94 extending into the valve body 54 forms a ball valve seat. A ball 116 blocks the fluid passageway 118 extending into the cylinder 74 from the valve seat. A manual pressure release valve shaft 120 is screwed into the counterbored opening and has a ball engaging end 122 that forces the ball against the valve seat to prevent fluid flow into the passageway 90b (FIG. 4).

A compression spring 130 has one end connected to the end of the piston rod, and the other end connected to the mounting portion of the foot pad 40.

Method of Operation

The load bracing crossbar 10 is initially adjusted to a length approximate to the width or height of the compartment in which the crossbar will be placed. The support rod member 26 is slid outward from the support member 20, and the pin 30 is moved into aligned holes 28 positioned in both the support member 20 and the support rod member 26. The load bracing crossbar 10 then is placed into position and the handle 62 pumped.

When the pump handle 62 is moved to the right, as shown in FIG. 4, the pump actuator 56 is moved to the left drawing the ball 97 toward the fluid chamber 54. Fluid is drawn through the channel 90 and 90a into the forward portion of the fluid holding chamber 54. As the pump handle 62 is moved to the left, the pump actuator 56 is moved forward pushing the ball 97 against the valve seat. The fluid in the other fluid channel 92 is forced through the channel 92, pushing the ball 112 away from the valve seat and forcing fluid into the cylinder 74.

As fluid is forced out of the fluid chamber, fluid from the reservoir 68 is forced into the rear portion of the fluid chamber 54 and the floating piston 70 is moved forward. The rod 82 is forced forward compressing the spring 130. As the handle is pumped more, the spring 130 compresses. When the spring 130 is fully compressed, further movement of the piston rod 82 forces the telescoping extension tube 38 outward from the support member 20 so that the foot pad 40 engages the compartment wall. If too much pressure is exerted against the piston and compartment wall, a pressure relief valve (not shown on the drawings) relieves pressure so that the crossbar doesn't force apart the compartment walls. When the crossbar is secured between the walls, any slack created by compartment transit is compensated by the compression spring 130. To release the pressure, the manual release valve 120 is turned, lifting the ball 116 off the valve seat, thus releasing pressure in the system so that the crossbar can be removed from the walls.

In the drawings and specification, there has been set forth a preferred embodiment of this invention, and although specific terms are employed, they are used in a generic and descriptive sense only and not for purposes and limitation.

What is claimed is:

1. An adjustable load bracing crossbar comprising
   an elongate, substantially hollow support body having opposing ends,
   means positioned at one end of the support body for engaging a wall of a compartment,
   a telescoping extension tube slidably received within the other end of the support body and including an end portion projecting from the tube and adapted for engaging another side wall of the compartment, and
   a hydraulic pump mechanism secured within the support body and including a piston movable within the telescoping wall-engaging tube between a retracted position and an extended position toward the end portion of the tube, and
   biasing means connected to the piston and the end portion of the telescoping tube for creating a biasing force between the piston in its extended position and telescoping tube when the crossbar is mounted within the compartment to compensate for slack created between the end portion and compartment wall such as occurs when the compartment is in transit.

2. An adjustable load bracing crossbar according to claim 1 wherein the biasing means connected to the piston and the end portion of the telescoping wall-engaging tube comprises a spring.

3. An adjustable load bracing crossbar according to claim 1 wherein the hydraulic pump mechanism includes a valve body having a fluid holding chamber, a pump actuator slidably mounted in the fluid holding chamber, a handle connected to the pump actuator for slidably moving the pump actuator back and forth when the handle is pumped, a fluid reservoir connected to one end of the valve body and communicating with the fluid chamber, and a piston cylinder connected to the end of the valve body adjacent the piston, the piston being mounted within the piston cylinder, and fluid channel means within the valve body, and communicating with the fluid holding chamber, fluid reservoir and piston cylinder for transferring fluid from the fluid reservoir to the piston cylinder as the pump actuator is moved for moving the piston and telescoping tube to an extended position.

4. An adjustable load bracing crossbar according to claim 3 including a manually operated pressure release valve connected to the fluid channel means for selectively relieving the pressure within the fluid channel means and the piston cylinder.

5. An adjustable load bracing crossbar according to claim 3 wherein the fluid reservoir comprises a cylindrically configured holding vessel mounted within the elongate support body, and the piston cylinder comprises a cylindrically configured holding vessel mounted within the elongate support body.

6. An adjustable load bracing crossbar according to claim 5 wherein the fluid holding chamber includes an open end in communication with the fluid reservoir, and wherein the fluid channel means interconnecting the fluid holding chamber, fluid reservoir and piston cylinder comprises a first fluid flow channel formed in the valve body and having one end connected to the fluid holding chamber end adjacent the piston and the other end connected to the fluid reservoir for allowing fluid flow from the reservoir into the front end of the chamber, a second fluid flow channel having one end connected to the fluid holding chamber end adjacent the piston and the other end connected to the piston cylinder for allowing fluid flow from the chamber into the piston cylinder, and valve means positioned in each of the first and second channels for allowing fluid flow from the reservoir into the front portion of the fluid holding chamber when the pump actuator is moved rearward, and for allowing fluid flow from the front portion of the fluid holding chamber into the piston cylinder when the pump actuator is moved forward while preventing fluid flow into the reservoir.

7. An adjustable load bracing crossbar according to claim 3 wherein the fluid reservoir includes a floating piston that is withdrawn through the fluid reservoir as the fluid is withdrawn from the reservoir into the cylinder.

8. An adjustable load bracing crossbar comprising
   an elongate, substantially hollow support body having opposing first and second ends,
   a support rod member slidably received in the first end of the support body, and including an end projecting from the support body, and a foot member pivotally mounted on the projecting end for engaging a wall of a compartment,
   a telescoping extension tube slidably received within the other end of the support body and including an end portion projecting from the support body, and a foot member pivotally mounted on the projecting end portion for engaging another wall of the compartment, and
   a hydraulic pump mechanism mounted within the support body and including a piston movable within the telescoping tube between a retracted position and an extended position toward the projecting end portion of the tube, wherein the hydraulic pump mechanism includes a valve body having a fluid holding chamber, a pump actuator slidably mounted in the fluid holding chamber, a handle connected to the pump actuator for slidably moving the pump actuator back and forth in the fluid holding chamber when the handle is pumped, a fluid reservoir connected to one end of the valve body and communicating with the fluid chamber, and a piston cylinder connected to the other end of the valve body, the piston being mounted within the piston cylinder, and valve channel means mounted in the valve body, and communicating with the fluid holding chamber, fluid reservoir and piston cylinder for transferring fluid from the fluid reservoir to the piston cylinder as the pump actuator is moved for moving the piston to an extended position.

9. An adjustable load bracing crossbar according to claim 8 and further including a spring connected to the piston and the end portion of the telescoping tube for creating a biasing force between the piston in its extended position and telescoped tube when the cross bar is mounted within the compartment to compensate for slack created between the end portion and compartment wall such as occurs when the compartment is in transit.

10. An adjustable load bracing crossbar according to claim 8 wherein the first end of the elongate support body and the support rod member each have a plurality of holes for allowing insertion of a pin through aligned holes of the support rod member and the support body when the support rod member is slidably extended from the support body.

11. An adjustable load bracing crossbar according to claim 8 wherein the fluid reservoir includes a floating piston that is withdrawn through the fluid reservoir as fluid is withdrawn from the reservoir into the cylinder.

12. An adjustable load bracing crossbar according to claim 8 wherein the valve body includes an open end in communication with the fluid reservoir, and wherein the valve channel means interconnecting the fluid holding chamber, fluid reservoir and piston cylinder comprises a first fluid flow channel having one end connected to the fluid holding chamber end adjacent the piston and the other end connected to the fluid reservoir for allowing fluid flow from the reservoir into the front end of the chamber, a second fluid flow channel having one end connected to the fluid holding chamber end adjacent the piston and the other end connected to the piston cylinder for allowing fluid flow from the fluid holding chamber into the piston cylinder, and valve means positioned in each of the first and second channels for allowing fluid flow from the reservoir into the front portion of the fluid holding chamber when the pump actuator is moved rearward, and for allowing fluid flow from the front portion of the fluid holding chamber into the piston cylinder when the pump actuator is moved forward while preventing fluid flow into the reservoir.

* * * * *